United States Patent [19]

Beadle et al.

[11] 4,017,439

[45] Apr. 12, 1977

[54] VULCANIZATION OF NEOPRENE

[75] Inventors: Howard C. Beadle; Lester A. Brooks, both of Norwalk, Conn.

[73] Assignee: R. T. Vanderbilt Company, Inc., Norwalk, Conn.

[22] Filed: July 31, 1975

[21] Appl. No.: 600,680

[52] U.S. Cl. .................. 260/79.5 B; 260/79.5 C
[51] Int. Cl.$^2$ ...................................... C08F 28/00
[58] Field of Search .................. 260/79.5 B, 79.5 C

[56] References Cited

FOREIGN PATENTS OR APPLICATIONS 2,227,338  12/1973  Germany
  956,659   4/1964  United Kingdom

OTHER PUBLICATIONS

Hofmann – *Vulcanization J Vulcanizing Agents* (Palmerton) (N.Y.) (1967), p. 258.
Koehler et al. – *Chem. Abs.* 64, 5278g (1966).
Kuchevskii et al. – *Chem. Abs.* 80, 84440f (1974).

*Primary Examiner*—Donald E. Czaja
*Assistant Examiner*—H. H. Fletcher
*Attorney, Agent, or Firm*—Rasma B. Balodis

[57] ABSTRACT

Vulcanizable compositions comprising neoprene, metal oxides and a binary accelerator system comprising 3,5-disubstituted 2H-1,3,5-thiadiazine-2-thione and a zinc salt of certain dithiocarbamates and method for curing same.

11 Claims, No Drawings

VULCANIZATION OF NEOPRENE

BACKGROUND OF THE INVENTION

1. Field of the Invention.

The present invention relates to the vulcanization of neoprene rubber by using a binary accelerator system in conjunction with metal oxides and to vulcanizates containing the same.

2. Description of the Prior Art.

Neoprene is a type of synthetic rubber based on polymers of chloroprene, i.e., polymers of 2-chloro-1,3-butadiene and includes copolymers of chloroprene with dienes or vinyl compounds in which chloroprene constitutes the predominant monomer. In practice, neoprene is grouped into two classes: "Sulfur modified" and "non-sulfur modified" (U.S. Pat. No. 3,370,051 which is incorporated herein by reference).

Generally, the sulfur modified neoprene requires only metal oxides for vulcanization. Conversely, the non-sulfur modified neoprene cures slowly with metal oxide curatives and a vulcanization accelerator must be added to effect suitable curing characteristics. In the past, a number of accelerators have been used as for example thioureas, triazines, imidazolidine-2-thiones, dithiocarbamic acid esters and others. On industrial scale, ethylenethiourea (2-mercaptoimidazoline) has been widely accepted as an all-purpose accelerator for neoprene. However, recently this material has been found to be carcinogenic and thus, for occupational safety reasons, there is a need for a safer alternative.

It is also known to utilize 3,5-disubstituted tetrahydro-2H-,1,3,5-thiadiazine-2-thiones as neoprene acceleratore (British Pat. No. 956,659). However, the vulcanization rate is relatively slow and other processing characteristics such as scorch resistance are not entirely satisfactory. Since the physical properties of he vulcanizate are related to its state of vulcanization, the vulcanization process had to be improved by increasing the vulcanization rate and/or the scorch delay period. In the past, this has been accomplished by adding a second accelerator of the thiourea type including ethylenethiourea to the thidadazine-2-thione accelerators (German Offfenlegungsschrift No. 2,227,338).

According to the present invention, a vulcanization accelerator for neoprene has been provided which contains no known carcinogens such as the above ethylenethiourea and yet provides vulcanizable compositions with balanced processing and vulcanization characteristics.

SUMMARY OF THE INVENTION

It has now been discovered that such improved vulcanizable composition can be provided by compounding neoprene rubber with metal oxides; accelerator having the structural formula

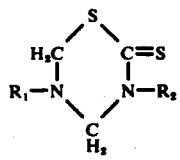

I wherein $R_1$ and $R_2$ represent straight chain and branched chain alkyl groups having one to four carbon atoms; and dithiocarbamate secondary accelerator having the structural formula:

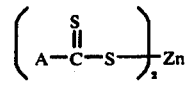

II wherein A represents the structural units

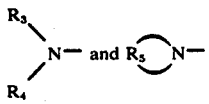

and $R_3$ is selected from straight chain and branched chain alkyl groups having one to four carbon atoms, phenyl and benzyl groups, $R_4$ is selected from benzyl and straight chain and branched chain alkyl groups having one to four carbon atoms, and $R_5$ represents a bivalent radical selected from pentamethylene, hexamethylene and 4-oxapentamethylene radicals. The compounded rubber is cured subsequently to form a vulcanizate with acceptable properties and with a minimal amount of scorching.

It is another object of the invention to provide vulcanizable compositions comprising neoprene rubber, metal oxides, a thiadiazine accelerator having the structrual formula I and dithiocarbamate activator having the structural formula II for said accelerator.

DESCRIPTION OF THE PREFERRED EMBODIMENTS

Metal salts of dithiocarbamates are well known rubber accelerators and are prepared by known methods. In one method, zinc dialkyldithiocarbamates are prepared by reacting mole equivalents of the corresponding dialkylamine, caustic soda and carbon disulfide and subsequently, converting the produced sodium dialkyldithiocarbamate to the corresponding zinc salt by treating with an aqueous solution of zinc sulfate.

In the past, metal salts of dithiocarbamates have been of no practical value as active accelerators for neoprene and, in some cases, have affected the cure. Unexpectedly, it has been now discovered that certain metal salts of dithiocarbamates function as secondary accelerators or activators in conjunction with 3,5-dialkyltetrahydro-2H,1,3,5-thiadiazine-2-thiones. When the metal dithiocarbamates are used together with the thiadiazine primary accelerator an improved curing rate and scorch resistance is obtained.

The metals usually associated with the dithiocarbamates are from Group IIa, IIb, and IVa of the periodic table. Examples of suitable metals salts are those of zinc, lead, and cadmium. Illustrative examples of compounds include zinc salts of dimethyldithiocarbamate, diethyldithiocarbamate, dipropyldithiocarbamate, diisopropyldithiocarbamate, diisobutyldithiocarbamate, dibutyldithiocarbamate, dibenzyldithiocarbamate, ethylphenyldithiocarbamate, bis(pentamethylene)dithiocarbamate, bis(hexamethylene)dithiocarbamate, bis(4-oxapentamethylene)dithiocarbamate and similar lead and cadmium salts. Particularly preferred are zinc dithiocarbamates which are generally less toxic than the corresponding lead and cadmium salts.

The thiadiazine compounds can be prepared by known methods as for example in German Offenlegungsschrift 2,227,338.

The binary accelator system of the invention comprises 3,5-disubstituted 2H-1,3,5-thiadiazine-2-thione and zinc dithiocarbamate in the ratio of about 0.8 to 0.5 parts by weight to about 0.2 to 0.5 parts by weight and preferably about 0.8 to 0.75 parts to about 0.2 to 0.25 parts thiadiazine to dithiocarbamate.

The accelerator system can be incorporated into the compounded neoprene rubber in the amount of about 0.25 to 3 parts per hundred parts rubber (phr), preferably 0.75 to 1.5 phr. Any satisfactory compounding procedure such as mechanical mixing may be used to incorporate the accelerator in the neoprene rubber.

Another component in the compounded neoprene rubber is metal oxide. The following compounds, among others, are staisfactory: zinc oxide, magnesium oxide, lead oxide and mixtures thereof. An especially preferred oxide component is 5 phr zinc oxide and 4 phr magnesium oxide. Any effective amount of oxide as 4 to 30 phr, preferably 4 to 15 phr can be compounded with the rubber.

Other ingredients may be compounded with the neoprene rubber. The following optional ingredients, among others, are applicable: antioxidants, plasticizers, peptizers, fillers, extenders, reinforcing materials, carbon blacks, fatty acids and lubricants.

Any suitable curing procedure and conditions may be employed in the invention. Two methods, among others, are to press-cure at a temperature of about 280° to 360° F. for about 10 to 120 minutes and to vulcanize continuously at a temperature of about 360° to 400° F. for about 5 to 150 seconds.

Thus, in accordance with the invention, a non-sulfur modified neoprene has been cured with a binary accelerator system comprising 3,5-dialkyltetrahydro-2H-1,3,5-thiadiazine-2-thione and a zinc dithiocarbamate in conjunction with certain metal oxides. A vulcanizate is obtained therefrom with reduced scorching. Furthermore, the vulcanizate of the invention has excellent mechanical and physical properties. Particularly noteworthy is the good compression set of the vulcanizates which is an important factor in certain applications, as for instance gaskets and seals.

The following examples are submitted to illustrate but not to limit the scope of the invention. Unless otherwise indicated, all parts and percentages in the specification and claims are based upon weight.

EXAMPLE I

Preparation of 3,5-dimethyltetrahydro-2H-1,3,5-thiadiazine-2-thione. 760g. (10 moles) carbon disulfide were added dropwise to 1934.5 g. 32 percent aqueous methylamine solution (20 moles) in about 1.5 hours while stirring and maintaining temperature to 20-30° C. After 1 minute, 2000 g. 30 percent aqueous formaldehyde solution (20 moles) was added in about one hour and subsequently, the reaction mixture was diluted with 2 l. water. The mixture was stirred for two hours at <30° C. The crystals were suction filtered, washed with water and dried at 50° C. in vacuum. A 94 percent yield of 3,5-dimethyltetrahydro-2H-1,3,5-thiadiazine-2-thione melting at 103°–5° C. was obtained.

EXAMPLE II

Vulcanization compositions were prepared by compounding nonsulfur modified neoprene with 3,5-dimethyltetrahydro-2H-1,3,5-thiadiazine-2-thione and zinc dibutyldithiocarbamate in different proportions and other conventional compounding ingredients to form samples as listed in Table I herebelow.

The samples were press-cured for 10 to 45 minutes at 153° C. The percent elongation, tensile strength and stress were determined according to ASTM D-412 method. The scorch time was measured according to Mooney and the compression set by the ASTM Method B. Physical data compiled in Table II show that the addition of up to 50 percent zinc dibutyldithiocarbamate to 3,5-dimethyltetrahydro-2H-1,3,5-thiadiazine-2-thione activates the cure rate and increases the state of he cure. The accelerator mixture developes better physical properties of the vulcanizate than either 3,5-dimethyltetrahydro-2H-1,3,5-thiadiazine-2-thione or zinc dibutyldithiocarbamate alone.

The zinc salt per se is particularly ineffective and produces vulcanizates of very poor quality particularly with regard to hardness and resilience as demonstrated by the compression set test and stress.

Table 1

| Ingredients | Vulcanizates (parts by weight) | | | | | |
| --- | --- | --- | --- | --- | --- | --- |
|  | 1 | 2 | 3 | 4 | 5 | 6 |
| Neoprene W | 100.0 | 100.00 | 100.0 | 100.0 | 100.0 | 100.0 |
| Stearic acid | 0.5 | 0.5 | 0.5 | 0.5 | 0.5 | 0.5 |
| Magnesium oxide | 4.0 | 4.0 | 4.0 | 4.0 | 4.0 | 4.0 |
| Agerite Stalite S (a) | 2.0 | 2.0 | 2.0 | 2.0 | 2.0 | 2.0 |
| Plastogen (b) | 5.0 | 5.0 | 5.0 | 5.0 | 5.0 | 5.0 |
| Carbon black | 75.0 | 75.0 | 75.0 | 75.0 | 75.0 | 75.0 |
| Zinc oxide | 5.0 | 5.0 | 5.0 | 5.0 | 5.0 | 5.0 |
| 3,5-dimethyltetrahydro-2H-1,3,5-thiadiazine-2-thione | 1.0 | 0.8 | 0.75 | 0.5 | .25 | — |
| Zinc dibutyldithiocarbamate | — | 0.2 | 0.25 | 0.5 | .75 | 1.0 |

(a) mixture of alkylated diphenylamines distributed by R. T. Vanderbilt Company, Inc.
(b) rubber processing aid distributed by R. T. Vanderbilt Company, Inc.

TABLE II

| Vulcanizate | Vulcanization Time (minutes) | Stress at 200% (psi) | Tensile Strength (psi) | Elongation (percent) | Hardness | Compression Set 70 hrs. at 100° C (%) | Mooney Scorch at 121° C | |
| --- | --- | --- | --- | --- | --- | --- | --- | --- |
|  |  |  |  |  |  |  | Minutes to 5 Point Rise | Plasticity |
| 1 | 10 | 180 | 1150 | 720 | 50 |  |  |  |
|  | 20 | 500 | 1540 | 550 | 56 |  |  |  |
|  | 30 | 700 | 1650 | 460 | 60 |  |  |  |
|  | 45 | 880 | 1700 | 440 | 63 |  |  |  |
|  | 40 |  |  |  |  | 21.05 | 21 | 43.5 |
| 2 | 10 | 360 | 1480 | 600 | 54 |  |  |  |

TABLE II-continued

| Vulcanizate | Vulcanization Time (minutes) | Stress at 200% (psi) | Tensile Strength (psi) | Elongation (percent) | Hardness | Compression Set 70 hrs. at 100° C (%) | Mooney Scorch at 121° C Minutes to 5 Point Rise | Plasticity |
|---|---|---|---|---|---|---|---|---|
|  | 20 | 610 | 1610 | 520 | 59 |  |  |  |
|  | 30 | 730 | 1670 | 470 | 61 |  |  |  |
|  | 45 | 800 | 1700 | 460 | 63 |  |  |  |
|  | 40 |  |  |  |  | 22 | 12 | 45 |
| 3 | 10 | 380 | 1520 | 620 | 55 |  |  |  |
|  | 20 | 620 | 1660 | 540 | 59 |  |  |  |
|  | 30 | 780 | 1700 | 510 | 62 |  |  |  |
|  | 45 | 800 | 1720 | 490 | 62 |  |  |  |
|  | 40 |  |  |  |  | 22.1 | 11 | 43 |
| 4 | 10 | 360 | 1520 | 620 | 53 |  |  |  |
|  | 20 | 510 | 1620 | 550 | 57 |  |  |  |
|  | 30 | 650 | 1760 | 530 | 59 |  |  |  |
|  | 45 | 720 | 1750 | 500 | 61 |  |  |  |
|  | 40 |  |  |  |  | 25.4 | 11 | 44 |
| 5 | 10 | 200 | 1320 | 700 |  |  |  |  |
|  | 20 | 300 | 1560 | 620 |  |  |  |  |
|  | 30 | 350 | 1640 | 600 |  |  |  |  |
|  | 45 | 390 | 1690 | 570 |  |  |  |  |
|  | 40 |  |  |  |  | 30 | 13 | 45 |
| 6 | 10 | 100 | 590 | 750 | 46 |  |  |  |
|  | 20 | 130 | 920 | 800 | 47 |  |  |  |
|  | 30 | 170 | 1180 | 800 | 48 |  |  |  |
|  | 45 | 200 | 1380 | 800 | 49 |  |  |  |
|  | 40 |  |  |  |  | 48.75 | 18 | 43 |

EXAMPLE III

Vulcanization compositions were prepared according to formulation 2 in Table II by using as accelerator a binary mixture of 0.8 parts 3,5-dimethyltetrahydro-2H-1,3,5-thiadiazine-2-thione and 0.2 parts of a zinc dithiocarbamate and for comparison, according to formulation 1 by using 1 part 3,5-dimethyltetrahydro-2H-1,3,5-thiadiazine-2-thione as sole accelerator. The samples were press-cured for 10 to 45 minutes at 153° C. Their physical properties were evaluated as in EXAMPLE II and compiled in Table III.

The rate of cure of vulcanizates containing zinc dithiocarbamate as secondary accelerator was superior to that of vulcanizates containing 3,5-dimethyltetrahydro-2H-1,3,5-thiadiazine-2-thione alone and consequently, the physical properties of the vulcanizates were also improved to various degrees as indicated in Table III. In addition, several samples, particularly formulations 8 and 12 showed considerable improvement in compression set values which is an important characteristic for certain applications such as gaskets and seals.

Table III

| Vulcanizate | Accelerator | Parts by Wt. | Vulcanization Time (min.) | Stress at 200% (psi) | Tensile Strength (psi) | Elongation (%) | Hardness | Compression Set 70 hrs. at 100° C. (%) | Mooney Scorch at 121° C Min. to 5 Point Rise | Plasticity |
|---|---|---|---|---|---|---|---|---|---|---|
| 7 | 3,5-Dimethyltetrahydro-2H-1,3,5-thiadiazine-2-thione (DTTT) | 1.0 | 10 | 225 | 875 | 620 | 52 |  |  |  |
|  |  |  | 20 | 725 | 2000 | 470 | 59 |  |  |  |
|  |  |  | 30 | 950 | 2025 | 400 | 62 |  |  |  |
|  |  |  | 45 | 1000 | 2075 | 380 | 64 |  |  |  |
|  |  |  | 40 |  |  |  |  | 23.2 | 19.0 | 45.5 |
| 8 | DTTT | 0.8 | 10 | 500 | 1850 | 520 | 57 |  |  |  |
|  | Zinc dimethyldithiocarbamate | 0.2 | 20 | 775 | 2025 | 420 | 60 |  |  |  |
|  |  |  | 30 | 900 | 2075 | 400 | 63 |  |  |  |
|  |  |  | 45 | 950 | 2075 | 360 | 64 |  |  |  |
|  |  |  | 40 |  |  |  |  | 19.8 | 10.0 | 44.0 |
| 9 | DTTT | 0.8 | 10 | 500 | 1825 | 550 | 57 |  |  |  |
|  | Zinc diisopropyldithiocarbamate | 0.2 | 20 | 850 | 2025 | 450 | 61 |  |  |  |
|  |  |  | 30 | 1000 | 2100 | 410 | 63 |  |  |  |
|  |  |  | 45 | 1100 | 2100 | 370 | 65 |  |  |  |
|  |  |  | 40 |  |  |  |  | 23.8 | 11.5 | 44.5 |
| 10 | DTTT | 0.8 | 10 | 400 | 1750 | 570 | 57 |  |  |  |
|  | Zinc ethylphenyldithiocarbamate | 0.2 | 20 | 775 | 2000 | 470 | 60 |  |  |  |
|  |  |  | 30 | 900 | 2030 | 400 | 63 |  |  |  |
|  |  |  | 45 | 1000 | 2100 | 400 | 64 |  |  |  |
|  |  |  | 40 |  |  |  |  | 25.7 | 11.5 | 45.0 |
| 11 | DTTT | 0.8 | 10 | 400 | 1775 | 590 | 55 |  |  |  |
|  | Zinc dibenzyldithiocarbamate | 0.2 | 20 | 775 | 2000 | 450 | 60 |  |  |  |
|  |  |  | 30 | 900 | 2075 | 410 | 63 |  |  |  |
|  |  |  | 45 | 975 | 2100 | 400 | 64 |  |  |  |
|  |  |  | 40 |  |  |  |  | 23.3 | 13.5 | 44.0 |
| 12 | DTTT | 0.8 | 10 | 500 | 1825 | 560 | 57 |  |  |  |
|  | Zinc bis(4-oxapentamethylenedithiocarbamate) | 0.2 | 20 | 850 | 2050 | 450 | 60 |  |  |  |
|  |  |  | 30 | 975 | 2100 | 400 | 63 |  |  |  |
|  |  |  | 45 | 1100 | 2150 | 380 | 65 |  |  |  |
|  |  |  | 40 |  |  |  |  | 21.1 | 14.0 | 44.5 |
| 13 | DTTT | 0.8 | 10 | 450 | 1850 | 580 | 57 |  |  |  |
|  | Zinc bis(pentamethylenedithiocarbamate) | 0.2 | 20 | 800 | 2000 | 450 | 60 |  |  |  |
|  |  |  | 30 | 900 | 2100 | 400 | 62 |  |  |  |
|  |  |  | 45 | 950 | 2100 | 380 | 63 |  |  |  |

Table III-continued

| Vulcanizate | Accelerator | Parts by Wt. | Vulcanization Time (min.) | Stress at 200% (psi) | Tensile Strength (psi) | Elongation (%) | Hardness | Compression Set 70 hrs. at 100° C. (%) | Mooney Scorch at 121° C Min. to 5 Point Rise | Plasticity |
|---|---|---|---|---|---|---|---|---|---|---|
| | | | 40 | | | | | 23.2 | 11.0 | 44.5 |
| | DTTT | 0.8 | 10 | 475 | 1775 | 510 | 56 | | | |
| | Zinc bis(hexamethyl-enedithiocarbamate) | 0.2 | 20 | 800 | 2000 | 450 | 61 | | | |
| | | | 30 | 950 | 2000 | 380 | 63 | | | |
| | | | 45 | 1000 | 2075 | 360 | 64 | | | |
| | | | 40 | | | | | 23.5 | 12.0 | 45.5 |

While certain representative embodiments have been shown for the purpose of illustrating the invention, it will be apparent to those skilled in the art that certain variations and modifications may be made therein without departing from the true scope of the invention.

What is claimed is:

1. A vulcanizable composition comprising a nonsulfur modified neoprene rubber; a metal oxide selected from zinc oxide, magnesium oxide and mixtures thereof; and about 0.25 to 3 phr of an accelerator system comprising a thiadiazine accelerator having the structural formula:

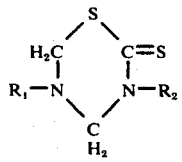

wherein $R_1$ and $R_2$ taken separately are each selected from the group consisting of straight chain and branched chain alkyl groups having one to four carbon atoms and a dithiocarbamate secondary accelerator having the structural formula:

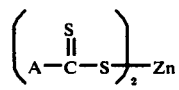

wherein A represents the structural units

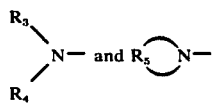

wherein $R_3$ is selected from straight chain and branched chain alkyl groups having one to four carbon atoms, phenyl, and benzyl groups, $R_4$ is selected from benzyl and, straight chain and branched chain alkyl groups having one to four carbon atoms, and $R_5$ is selected from pentamethylene, hexamethylene and 4-oxapentamethylene radicals and the ratio of the thiadiazine to dithiocarbamate is about 0.8 to 0.5 parts by weight to about 0.2 to 0.5 parts by weight.

2. The composition according to claim 1 in which the accelerator system is incorporated in e amount of about 0.75 to 1.5 phr.

3. A vulcanizable composition comprising a nonsulfur modified neoprene rubber; a metal oxide selected from zinc oxide, magnesium oxide and mixtures thereof; and about 0.25 to 3 phr of an accelerator system comprising 3,5-dimethyltetrahydro-2H-1,3,5-thiadiazine-2-thione accelerator and a dithiocarbamate secondary accelerator having the structural formula:

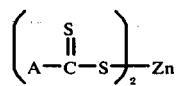

wherein A represents the structual units

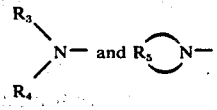

wherein $R_3$ is selected from straight chain and branched chain alkyl groups having one to four carbon atoms, phenyl, and benzyl groups, $R_4$ is selected from benzyl, straight chain and branched chain alkyl groups having one to four carbon atoms, and $R_5$ is selected from pentamethylene, hexamethylene and 4-oxapentamethylene radicals and the ratio of the thiadiazine to the dithiocarbamate is about 0.8 to 0.5 parts by weight to about 0.2 to 0.5 parts by weight.

4. The composition according to claim 3 in which the dithiocarbamate is zinc dibutyldithiocarbamate.

5. A process fo providing a vulcanizate with excellent physical properties and with reduced scorching comprising compounding a non-sulfur modified neoprene rubber with a metal oxide selected from zinc oxide, magnesium oxide and mixtures thereof; and about 0.25 to 3 phr of an accelerator system comprising a thiadiazine accelerator having the structural formula:

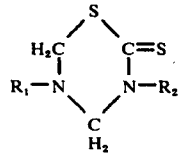

wherein $R_1$ and $R_2$ taken separately are each selected from the group consisting of straight chain and branched chain alkyl groups having one to four carbon atoms and a dithiocarbamate accelerator having the structural formula:

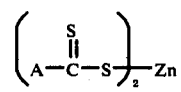

wherein A represents the structural units

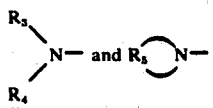

wherein $R_3$ is selected from straight chain and branched chain alkyl groups having one to four carbon atoms, phenyl, and benzyl groups, $R_4$ is selected from benzyl and straight chain and branched chain alkyl groups having one to four carbon atoms, and $R_5$ is selected from pentamethylene, hexamethylene and 4-oxapentamethylene radicals and the ratio of the thiadiazine to dithiocarbamate is about 0.8 to 0.5 parts by weight to about 0.2 to 0.5 parts by weight and curing.

6. The process according to claim 5 in which the accelerator system is incorporated in the amount of about 0.75 to 1.5 phr.

7. A process for providing a vulcanizate with excellent physical properties and with reduced scorching comprising compounding a non-sulfur modified neoprene rubber with a metal oxide selected from zinc oxide, magnesium oxide and mixtures thereof; and about 0.25 to 3 phr of an accelerator system comprising 3,5-dimethyltetrahydro-2H-1,3,5-thiadiazine-2-thione accelerator and a dithiocarbamate secondary accelerator having the structural formula:

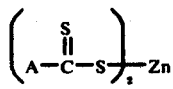

wherein A represents the structual units:

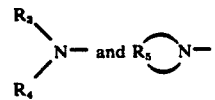

wherein $R_3$ is selected from straight chain and branched chain alkyl groups having one to four carbon atoms, phenyl, and benzyl groups, $R_4$ is selected from benzyl and straight chain and branched chain alkyl groups having one to four carbon atoms, and $R_5$ is selected from pentamethylene, hexamethylene and 4-oxapentamethylene radicals and the ratio of the thiadiazine to the dithiocarbamate is about 0.8 to 0.5 parts by weight to about 0.2 to 0.5 parts by weight and curing.

8. The process according to claim 7 in which the dithiocarbamate is zinc dibutyl dithiocarbamate.

9. The process according to claim 7 in which the accelerator system is incorporated in the amount of about 0.75 to 1.5 phr.

10. A vulcanizable composition comprising a non-sulfur modified neoprene rubber; a metal oxide selected from zinc oxide, magnesium oxide and mixtures thereof; and about 0.25 to 3 phr of an accelerator system comprising 3,5-dimethyletetrahydro-2H-1,3,5-thiadiazine-2-thione and zinc dibutyldithiocarbamate wherein the ratio of the thiadiazine to the dithiocarbamate is about 0.8 to about 0.5 parts by weight to about 0.2 to 0.5 parts by weight.

11. A process for providing a vulcanizate with excellent physical properties and with reduced scorching comprising compounding non-sulfur modified neoprene rubber with a metal oxide selected from magnesium oxide, zinc oxide and mixtures thereof and about 0.25 to 3 phr of an accelerator system comprising 3,5-dimethyltetrahydro-2H-1,3,5-thiadiazine 2-thione and zinc dibutyldithiocarbamate in the weight ratio of about 0.8 to 0.5 parts to about 0.2 to 0.5 parts and curing.

* * * * *

UNITED STATES PATENT AND TRADEMARK OFFICE
CERTIFICATE OF CORRECTION

PATENT NO. : 4,017,439

DATED : April 12, 1977

INVENTOR(S) : Howard C. Beadle; Lester A. Brooks

It is certified that error appears in the above-identified patent and that said Letters Patent are hereby corrected as shown below:

| | | |
|---|---|---|
| Title page, | Column 2, line 2, | "J" should be -- and --; |
| Column 1, | line 33, | "tetrahydro-2H-,1,3,5-thiadiazine-2-thiones" should be -- tetrahydro-2H-1,3,5-thiadiazine-2-thiones --; |
| Column 1, | line 33, | "acceleratore" should be -- accelerators --; |
| Column 1, | line 38, | "he" should be -- the --; |
| Column 1, | line 44, | "thidadazine-2-thione" should be -- thiadiazine-2-thione --; |
| Column 1, | line 45, | "offfenlegungsschrift" should be -- offenlegunsshrift --; |
| Column 2, | line 46, | "3,5-dialkyltetrahydro-2H,1,3,5-thiadiazine-2-thiones." should be -- 3,5-dialkyltetrahydro-2H-1,3,5-thiadiazine-2-thiones. --; |
| Column 3, | line 15, | "staisfactory" should be -- satisfactory --; |
| Column 4, | line 37, | "he" should be -- the -- and "developes" should be -- develops --; |
| Column 6, Table III, under Col. 6 at line 15, | | "2030" should be -- 2050 --; |
| Column 7, Table III, under Col. 1 at line 2, | | insert -- 14 --; |
| Column 7, | line 62, | "e" should be -- the --; |
| Column 8, | line 41, | "fo" should be -- for --; |
| Column 10, | line 26, | "3,5-dimethyletetrahydro-2H-1,3,5-thiadiazine-2-thione" should be -- 3,5-dimethyltetrahydro-2H-1,3,5-thiadiazine-2-thione --; |
| Column 10, | line 36, | "3,5-dimethyltetrahydro-2H-1,3,5-thiadiazine 2-thione" should be -- 3,5-dimethylte- |

UNITED STATES PATENT OFFICE
CERTIFICATE OF CORRECTION

Patent No. 4,017,439      Dated April 12, 1977

Inventor(s)   Howard C. Beadle et al.

It is certified that error appears in the above-identified patent and that said Letters Patent are hereby corrected as shown below:

trahydro-2H-1,3,5-thiadiazine-2-thione --.

Signed and Sealed this twelfth Day of July 1977

[SEAL]

Attest:

RUTH C. MASON
*Attesting Officer*

C. MARSHALL DANN
*Commissioner of Patents and Trademarks*